United States Patent [19]

Hernandez et al.

[11] Patent Number: 6,032,186
[45] Date of Patent: Feb. 29, 2000

[54] SYSTEM AND METHOD FOR REMOTE INFORMATION ACCESS

[75] Inventors: Brian S. Hernandez, Morristown; Anne Hurley, Somerset, both of N.J.

[73] Assignee: AT&T Corp, New York, N.Y.

[21] Appl. No.: 09/015,268

[22] Filed: Jan. 29, 1998

[51] Int. Cl.[7] .................................................. G06F 13/00
[52] U.S. Cl. ........................................ 709/227; 709/217
[58] Field of Search .................. 395/200.47, 200.48, 395/200.49; 709/217, 218, 219, 226, 228, 229, 300, 227; 379/355; 370/352

[56] References Cited

U.S. PATENT DOCUMENTS

| | | | |
|---|---|---|---|
| 5,280,581 | 1/1994 | Bathrick et al. ............. | 709/228 X |
| 5,455,858 | 10/1995 | Lin ............................. | 379/355 |
| 5,455,953 | 10/1995 | Russell ........................ | 709/300 X |
| 5,560,008 | 9/1996 | Johnson et al. ............. | 709/229 X |
| 5,586,257 | 12/1996 | Perlman ...................... | 709/226 X |
| 5,737,333 | 4/1998 | Civanlar et al. ............. | 370/352 |
| 5,802,304 | 9/1998 | Stone .......................... | 709/227 |
| 5,917,904 | 6/1999 | Theis ........................... | 379/355 |

OTHER PUBLICATIONS

Smith Micro software Inc., MacComCenter User's Guide, Documentation Revision 1, copyright 1994, pages, 39–43.

*Primary Examiner*—Zarni Maung
*Assistant Examiner*—Patrice Winder

[57] ABSTRACT

A method and system for accessing a remote destination via a telecommunications network is described. The invention begins dialing the standard local dial-up sequence and automatically interrupts the dial string to prompt for parameters which are entered to access an intermediate communication site. The user is prompted to enter a series of remote access parameters. Connection to a U.S. based local server is made, and the invention automatically releases the dial string and inserts the remaining destination parameters to complete the connection to the remote destination.

28 Claims, 3 Drawing Sheets

SYSTEM AND METHOD FOR REMOTE INFORMATION ACCESS

BACKGROUND OF THE INVENTION

1. Field of Invention

The invention relates to communications technology. In particular, the invention relates to remotely accessing information sites or communications access points via a standard telecommunication network.

2. Description of Related Art

Under existing telecommunications protocols, a party attempting to access an information site (including a communications access point) in the United States (such as, but not limited to, an internet or electronic mail provider) from a location outside the Untied States must enter a lengthy dial string, which includes special international dialing codes, as well as local area code and telephone numbers to the information site. A user outside the United States may also be required to use specialized communications hardware, such as telephone jacks or line couplers, for example, as well as particularized dial tones and protocols suitable and for use in a given host country.

A party outside the United States trying to reach an information site in the United States typically utilizes a communications access device, such as a modem. Conventional modem dial-up packages prompt the user to enter the entire domestic telephone code of the destination (when, for example, trying to access company electronic mail). Many existing conventional web browsers will continue to dial the same domestic code entered during the first use (a default setting). This presents a problem to a user outside the United States trying to access an information site in the United States, because the dial string must be entered in stages. The first stage involves making a connection from the user's location, such as a hotel, to a foreign network element. This first network element receives the user's communication and contacts a second network element in the United States, such as the commercially available AT&T Direct® service. Once a connection is made with a network element located in the United States, a dial tone is emitted over the existing connection to prompt the user for a local dialing code which is required to connect with the information site. Therefore, successfully connecting to the information site requires dialing in two or more stages.

Conventional modems and related communications packages are not configured to facilitate incremental or step dialing. Typically, they require a user to enter the entire domestic dialing code when initially prompted. However, a user outside the United States cannot enter the entire dial string, including international parameters, necessary to connect with an information site in the United States because a connection must first be made to a regional network element, then relayed to a network element in the United States, before a local dial tone (or domestic code) is presented for entry of a local dial string used to access the final destination.

Therefore, there is a need in the industry for an apparatus and method which allows a user outside the United States to efficiently access a remote destination via standard telecommunications network connections, without cumbersome manipulation of dialing equipment.

SUMMARY OF THE INVENTION

The invention overcoming these and other problems in the art relates to a system and method for remotely accessing an information site over a telecommunications network, including the ability to allow a user to access a remote destination via standard telephone links. In operation, a user is prompted by application software to enter various remote destination parameters necessary to connect to the desired local information site. The invention executes the remote destination parameters, first connecting with a regional network element such as a European network server or switch, then connecting with the overseas network element and finally connecting with the desired destination all while running conventional Web browsing or other access packages. The invention freezes the local dial string and executes dialing in stages which allows the user to connect to a communications site outside the United States using a standard modem and standard telephone communication system, on a single call.

The method and system of the invention operate without requiring special data lines, finding of local nodes, pre-subscribing to a large network service or subscribing to any particular electronic mail system. The invention consequently provides for efficient implementation of overseas communication over existing network systems.

BRIEF DESCRIPTION OF THE DRAWINGS

The invention is described with reference to the following drawings wherein like numerals represent like elements, and wherein.

DETAILED DESCRIPTION OF PREFERRED EMBODIMENTS

Figure 1:
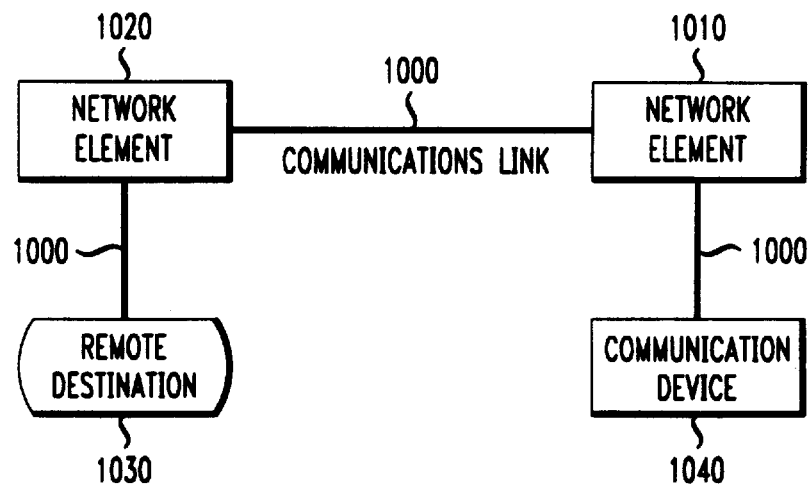
FIG. 1 is a block diagram of a first illustrative embodiment of the invention.

FIG. 1 shows structural elements according to a first illustrative embodiment of the invention. A communications device 1040 is connected to network element 1010 via a conventional communications link 1000, such as landline, fiber optic, microwave or other links. The network element 1010, which may be a commercially available network switch or server, is connected to a similar second network element 1020 via a further segment of communication link 1000 and network element 1020 is connected to a remote destination 1030, illustratively an internet service provider located in the United States reached via a last segment of communication link 1000. While FIG. 1 shows only two network elements 1010 and 1020 servicing a single communications device 1040 and a single remote destination 1030, additional network elements, communications devices and remote destinations may be included.

When a user wishes to access a remote destination via the telecommunications network 1000, the user first activates a communications device 1040, which illustratively may be a standard modem contained in a portable computer. After initializing standard Web browser or other access software, typically pre-loaded with local dial codes, the invention suspends the local dial-up sequence to the information site. The user interface system of the invention (illustrated in greater detail in FIG. 4) queries the user regarding the necessary dialing protocol information required to reach the remote information site from the foreign location, while the local dial-up sequence remains frozen. The dialing protocol information the user is queried for includes country codes, tone/pulse settings, billing parameters and other information required to establish a foreign communications link to the network element 1010 as an intermediate step. Once the dialing protocol information is entered, the communications device 1040 accesses network element 1010 via communications link 1000. Once network element 1010 has received a prompt from communications device 1040, connection is secured to network element 1020. Once that connection is made (indicated, for example, by a "bong" sound in the AT&T Direct® server) followed by presentation of a local dial tone, the local dial-up string is released at communications device 1040, and the remaining portion of the dialing protocols are executed. In this manner, network element 1010 contacts network element 1020, which in turn releases the local dial string in order to contact remote information site 1030 via communications link 1000. At this point, the user has reached the desired remote information site as his or her destination, utilizing the standard telecommunications network. No specialized hardware or complex dialing sequences are required, and access is achieved in one continuous connection.

Figure 2:
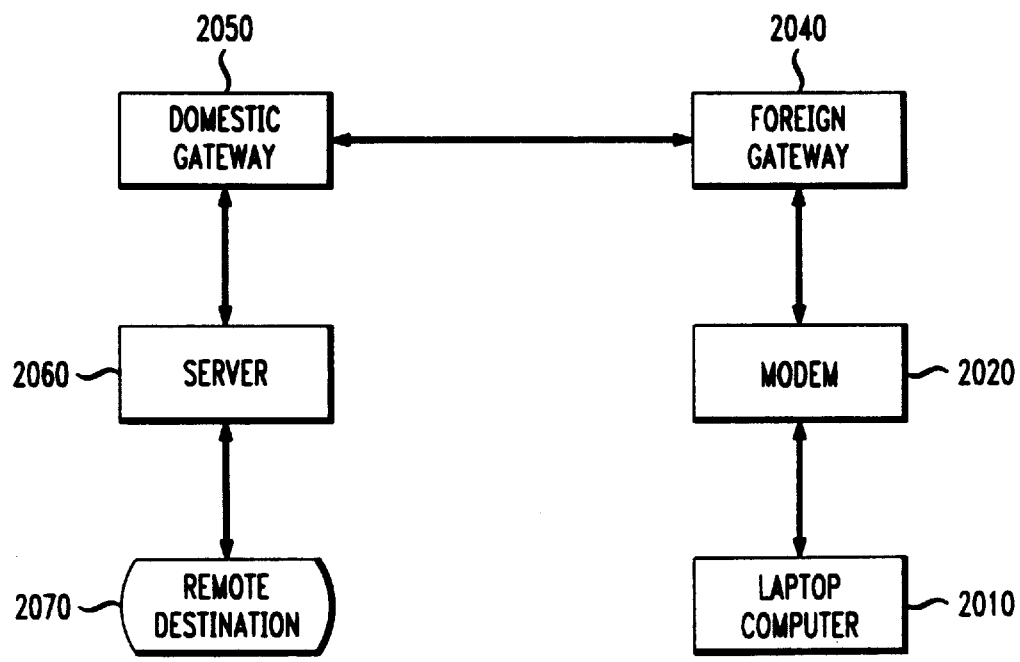
FIG. 2 is a block diagram of a second illustrative embodiment of the invention.

FIG. 2 illustrates a second illustrative embodiment of the invention, generally similar to the first. More particularly in the second illustrative embodiment, a user accesses a laptop computer 2010 to reach remote destination 2070. The user accesses the laptop software user interface which executes a series of steps illustrated in FIG. 4. At this point, the necessary dial string has been entered by the user to facilitate communication with remote information site 2070. Communication between the laptop computer 2010 and external devices is executed by modem 2020. The modem 2020, instructed by the user interface, allows a portion of the dial string entered by the user to access a foreign gateway 2040 to be executed, suspending the remaining domestic code or dial string. Foreign gateway 2040 is a network element necessary for leaving the overseas site and communicating with a domestic destination. The user interface controls the limited dialing and related information and initializes a second dialing step, once the foreign gateway 2040 has been established.

Foreign gateway 2040 then dials domestic gateway 2050, which could be the AT&T Direct® platform, using the dial string provided by the user interface software. At this point, the user interface releases the additional portion of the dial string to modem 2020 to the foreign gateway 2040. The domestic gateway 2050 then receives the remainder of the dial string from the user interface in order to access the remote information site 2070 via server 2060. In this manner, a user has successfully accessed a remote information site 2070, again such as a U.S. based electronic mail server, via a laptop computer 2010.

Figure 3:
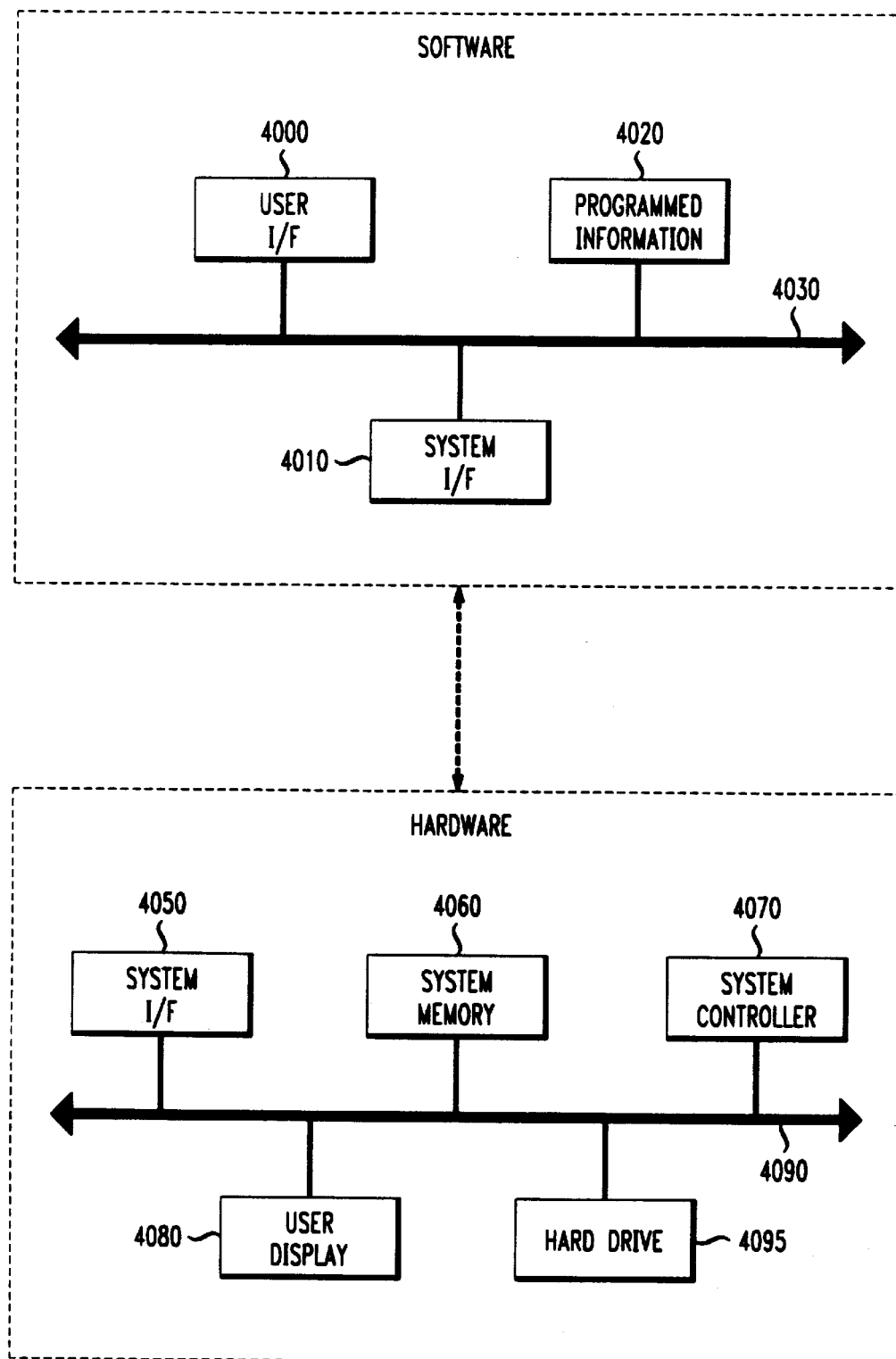
FIG. 3 is a block diagram of a user device.

FIG. 3 is a block diagram depicting the invention implemented on illustrative system hardware. The user interface 4000 is implemented with GUI software, illustrated as programmed information 4020, including system interface 4010. User interface 4000 may be suitably implemented as dialogue boxes running on any operating system, such as, Windows 95, UNIX, or other standard computing platforms, as well as with multiple communications packages, for example, with America On Line®. The software is executed on a hardware system which includes a system interface 4050, system memory 4060, system controller 4070, user display 4080, such as an LCD screen, and hard drive 4095 and related components, as will be familiar to persons skilled in the art. The hardware elements are coupled together with signal bus 4090.

In operation, a user logs on to the computer using user display 4080. If the user is seeking to connect to a remote destination and requires use of the invention, the user enters this desire via the user display 4080, mouse clicks and keyboard information operating under user interface 4000. The system controller 4070 receives the user's request and accesses the user interface from hard drive 4095. The system hardware interacts with the software via system interface 4050 and system interface 4010. The system controller 4070 accesses the programmed information 4020 using the interface as described above. The programmed information 4020 is processed in a manner described in greater detail with respect to in FIG. 4, and is placed into a format suitable for user interaction utilizing user interface 4000. As described with reference to FIG. 4, the user is interrogated with a series of inquiries regarding the desired destination. The user inputs this information via user display 4080, and the information is stored in system memory 4060. When all the necessary dialing information is assembled, the user instructs the system to begin the dialing process.

The programmed information 4020 instructs the system controller 4070 to dial only part of the entire dial string before freezing execution of the dial string. When a first connection to the first network element is made, the system controller 4070 accesses the remaining dial string from system memory 4060 and completes the dialing sequence.

Figure 4:
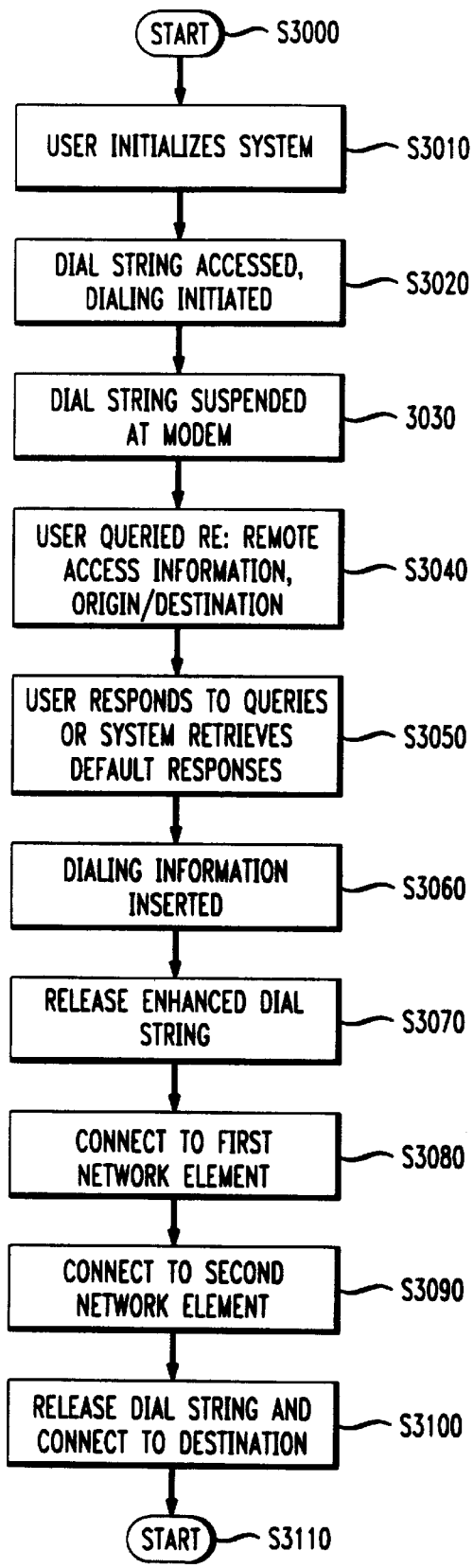
FIG. 4 is flow chart illustrating the sequence for connecting to a remote destination according to an embodiment the invention.

FIG. 4 is a flow chart illustrating the process steps for the execution of the invention which allows a user to access a remote information site according to an embodiment of the invention.

In step S3010, the user signs on, initializing the system hardware via user display 4080 and the process goes to step S3020. The user display may, for example, include a personal computer or laptop computer equipped with a display, keyboard and mouse. In step S3020, the system controller 4070 accesses the dial string stored in hard drive 4095 and initiates the dialing step sequence and the process goes to step S3030.

In step S3030, the system controller 4070, instructed by programmed information 4020 suspends the dial string and the process goes to step S3040.

In step S3040, the system controller 4070 queries the user based upon programmed information 4020, specifically requesting origin and destination parameters, and the process goes to steps S3050. The queries may, for example, include international dialing codes, network information, dial tone/pulse information and various hardware parameters, including the type of phone jack.

In step S3050, the user responds to the queries raised by programmed information 4020. The user may input the desired parameters utilizing user interface 4080 and the entered parameters are stored by the system controller 4070 into the system memory 4060. Alternatively, the system controller 4070 may retrieve pre-stored parameters stored in hard drive 4090 if those parameters are pre-programmed by a given user. The process then goes to step S3060.

In step S3060, the system controller 4070 retrieves the stored parameters from system memory 4060 and inserts them into the dial string and the process goes to step S3070. In step S3070, the dial string, which has been suspended, is released by controller 4070 and the process goes to step S3080.

In step S3080, the system controller 4070 begins dialing the dial string in order to reach the remote destination, for example, the first network element, and the process goes to step S3090. In step S3090, the system controller 4070 releases the dial string necessary to connect with the second network element, and the process goes to S3100.

In step S3100, the system controller 4070 receives a domestic dial tone and releases the final dial string for connecting with the remote destination and the process goes to step S3110 and ends.

While this invention has been described in conjunction with specific embodiments thereof, it is evident that many alternatives, modifications to variations will be apparent to those skilled in the art. For example, while the invention has been described in terms of computer devices accessing e-mail and other accounts using standard modem protocols, many other devices and protocols, such as personal digital assistants, pagers, voice mail, digital or analog cellular telephones and other communications enabled systems are contemplated to benefit from the smooth, prompt and user friendly access facility provided by the invention. Accordingly, preferred embodiments of the invention as set forth herein are intended to be illustrative, not limiting. Various changes may be made without departing from the spirit and scope of the invention as defined in the following claims.

What is claimed is:

1. A storage medium for storing information to operate a computer to access a remote destination, the stored information operating the computer to execute the steps of:

suspending the execution of access information used by a communications access device to connect to the remote destination, wherein the access information is capable of being a dial string;

accepting remote access information;

inserting said remote access information into said access information to establish an enhanced dial string; and using the enhanced dial string to access the remote destination from the computer.

2. The storage medium according to claim 1, the steps further comprising accessing the remote destination using said communications access device and said access information.

3. The storage medium according to claim 2, wherein said accessing step further comprises the step of accessing a first server configured to accept said remote access information.

4. The storage medium according to claim 3, wherein said accessing step further comprises the step of accessing a second server configured to communicate with said first server using said remote access information to execute the access of the remote destination.

5. The storage medium according to claim 1, wherein said accepting step further comprises querying a user for at least some of said remote access information.

6. The storage medium according to claim 1, wherein said accepting step further comprises retrieving at least some of said remote access information from a database.

7. The storage medium according to claim 1, wherein said access information comprises a dial string, steps further comprising:

releasing the dial string after said inserting step; and dialing the remote destination using said access information.

8. The storage medium according to claim 1, wherein said remote access information comprises international calling parameters.

9. The storage medium according to claim 1, wherein said storage medium comprises removable computer-readable media.

10. A method of accessing a remote destination comprising the steps of:

suspending the execution of access information used by a communications access device to connect to the remote destination, wherein the access information is capable of being a dial string;

accepting remote access information;

inserting said remote access information into said access information to establish an enhanced dial string; and using the enhanced dial string to access the remote destination from the communications access device.

11. The method according to claim 10, wherein said remote destination comprises an information service provider.

12. The storage medium according to claim 11, wherein said information service provider provides electronic mail, and a user accesses electronic mail via the remote access.

13. The method according to claim 10, further comprising the step of accessing the remote destination using said access information.

14. The method according to claim 13, wherein said accessing step further comprises the step of accessing a first server configured to accept said remote access information.

15. The method according to claim 14, wherein said accessing step further comprises the step of accessing a second server configured to communicate with said first server using said remote access information to execute the access of the remote destination.

16. The method according to claim 10, wherein said accepting step further comprises querying a user for at least some of said remote access information.

17. The method according to claim 10, wherein said accepting step further comprises retrieving at least some of said remote access information from a database.

18. The method according to claim 10, wherein said access information comprises a dial string.

19. The method according to claim 18, further comprising the steps of:

releasing said dial string after said inserting step; and dialing the remote destination using said access information.

20. The method according to claim 18, wherein said dial string comprises a local telephone number.

21. The method according to claim 10, wherein said remote access information comprises international calling parameters.

22. The method according to claim 10, wherein said communications access device comprises a modem.

23. A system operating in a network for accessing a remote destination, comprising:

an information processing device coupled to the network and configured with access information to access the remote destination;

a first network element which receives remote access information from said information processing device via the network;

a second network element which is prompted by said first network element, said second network element forming a connection with the remote destination via said network, wherein said information processing device suspends the execution of said access information to accept said remote access information, wherein the access information is capable of being a dial string, and inserts said remote access information into said access information to establish an enhanced dial string to access the remote destination from the information processing device.

24. The system according to claim 23, wherein said information processing device comprises a computer.

25. The system according to claim 23, wherein said computer comprises a modem, said access information comprises a dial string, and said remote access information comprises international calling parameters.

26. An information processing device for accessing a remote destination over a network, comprising:
   a communications access device configured with access information to access the remote destination, wherein the access information is capable of being a dial string;
   a processor, coupled to said communications access device, said processor suspending the execution of said access information to accept remote access information, and inserting said remote access information into said access information to establish on enhanced dial string to access the remote destination from the communications access device.

27. The device according to claim 26, wherein said information processing device comprises a computer.

28. The device according to claim 26, wherein the communications access device comprises a modem, said access information comprises a dial string, and said remote access information comprises international calling parameters.

* * * * *